United States Patent [19]
Mannig et al.

[11] Patent Number: 5,264,229
[45] Date of Patent: Nov. 23, 1993

[54] SHELF LIFE EXTENSION FOR COMMERCIALLY PROCESSED POULTRY/FOWL AND SEAFOOD PRODUCTS USING A SPECIALIZED HYDROGEN PEROXIDE

[75] Inventors: Detlef Mannig, Grosskrotzenburg, Fed. Rep. of Germany; Gerd Scherer, Montvale, N.J.

[73] Assignee: Degussa Corporation, Ridgefield Park, N.J.

[21] Appl. No.: 871,078

[22] Filed: Apr. 20, 1992

[51] Int. Cl.$^5$ ................................................ A23L 3/34
[52] U.S. Cl. ..................................... 426/335; 426/641; 426/643; 426/644; 426/654
[58] Field of Search ................ 426/335, 654, 310, 92, 426/641, 643, 644

[56] References Cited

U.S. PATENT DOCUMENTS

| | | | |
|---|---|---|---|
| 3,622,351 | 11/1971 | Cavallo | 426/335 |
| 4,164,477 | 8/1979 | Whitley | 252/99 |
| 4,683,618 | 8/1987 | O'Brien | 17/51 |
| 4,770,884 | 9/1988 | Hill et al. | 426/332 |

Primary Examiner—Helen F. Pratt
Attorney, Agent, or Firm—Beveridge, DeGrandi, Weilacher & Young

[57] ABSTRACT

Shelf life of commercially processed poultry and seafood can be extended by introducing food grade $H_2O_2$ and food grade surface active agents into the chiller water to wash off bacteria on the surface of the food product. The agents are alkylaryl sulfonates, sulfates, sulfonates of oils and fatty acid, sulfate of alcohols and sulfosuccinates.

6 Claims, No Drawings

SHELF LIFE EXTENSION FOR COMMERCIALLY PROCESSED POULTRY/FOWL AND SEAFOOD PRODUCTS USING A SPECIALIZED HYDROGEN PEROXIDE

BACKGROUND OF THE INVENTION

The present invention relates to the commercial processing of poultry, fowl and seafood and, more particularly, to a method of increasing the shelf life of such commercially processed products. In more detail, the present invention relates to a new application for hydrogen peroxide to extend the shelf life of commercially processed foods of the type described herein. Specifically, the herein described invention relates to efforts conducted to extend the customary commercial shelf life of the various animals processed in commercial slaughtering plants.

Poultry, other fowl and fish (e.g. chicken, turkey, duck, geese, catfish, trout, shrimp and salmon, etc.) are processed in commercial slaughtering plants in a similar way. The final treatment step is the chilling of the processed carcass or meat to a suitable temperature, possibly in the range of 36°-42° F. This is accomplished by using a mixture of water and ice in a so-called chiller. As is known in the art, a commercial chiller is usually a stainless steel tank where the processed carcass or meat is immersed into the water/ice mixture, moved through it by mechanical means and retrieved at the other end. The retention time depends on the type of animal processed. For example, the time for chickens is between thirty and sixty minutes, for catfish it is between twenty and fifty minutes. These periods of time have been established through actual commercial practices and can be varied depending on surrounding conditions as will be apparent to those skilled in the art.

The average amount of water used per carcass or meat also depends on the type of animal processed; e.g. for chickens it is approximately 0.5 gallons of chiller water per carcass, for turkey it is approximately 0.8 gallons of chiller water per carcass and for catfish meat it is generally between 0.3 and 1 gallon of water per piece. Based on actual commercial operations over the years, these amounts of water have been found to be satisfactory to achieve the intended purpose. As with all such processing conditions, the precise values can change depending on overall conditions.

To accomplish an even temperature distribution in the chiller, the water is agitated with compressed air or by mechanical devices. To control bacterial cross-contamination, in the past and even at present, chlorine is used in the chiller water. Chlorine levels vary for the different animals processed, but is usually between 10 and 70 ppm. In spite of the chlorine used, there are still a significant number of micro-organisms (up to $10^8$) on the processed carcasses or meat. Chlorine is, of course, an environmentally hazardous material and is undesirable to have in contact with food and people.

The remaining bacterial contamination on the processed animal has a strong impact on the achievable shelf life. Assuming ideal storage and transportation conditions, the shelf life of chicken and turkey is between ten and twenty days, with the industry average being fifteen days. For processed catfish, the shelf life usually achieved is ten to fifteen days, with the industry average being twelve days.

Hydrogen peroxide ($H_2O_2$) was first evaluated by the applicants to eliminate salmonella organisms from processed poultry and other fowl. A concentration of 0.1% $H_2O_2$ was used to eliminate all salmonella organisms in a substrate petri dish. Utilizing the same concentration of $H_2O_2$ under chiller water conditions brought no reduction in salmonella. After increasing the concentration to 1%, a 50-60% reduction in salmonella under processing conditions was obtained. The analysis of the poultry and fowl so treated was carried out using ground pieces of the breast feather tray and a DNA probe, which the art recognizes as representing the most stringent test method available for salmonella. The treated birds were severely bleached and the skin was partially damaged. The areas of the neck and the vent opening were especially effected. The same effects were reported by H. S. Lillard and J. E. Yhompson in volume 48 of the Journal of Food Science, 1983. Beyond the detrimental effects of hydrogen peroxide to the poultry carcasses at this concentration, it was noted that all of the undesirable side effects disappeared after storing the carcasses one day at refrigeration temperature. These effects were previously reported by Mulder, van der Hulst and Bolder in a publication of the Journal of Poultry Science, volume 66, 1987.

The poor efficacy of the high concentration of $H_2O_2$ versus the excellent results obtained in the petri dish can be explained by the hydrophobic and hydrophilic conditions between the poultry skin and the chiller water during commercial processing. The fatty surface of the poultry carcass does not allow sufficient contact between the $H_2O_2$ and the actual skin surface to which the bacteria are attached. The same holds true for all commercially processed fowl and was reconfirmed for commercially processed fish. A publication from H. S. Lillard in volume 53 of the Journal of Food Science, 1988, further explains the mechanism by which salmonella attaches to poultry skin and muscles, and outlines the possibility that some microorganisms are entrapped in the skin pores or exposed tissue. Nevertheless, there were indications that the use of surfactants could be of help in controlling salmonella attachment to the skin. The effect of surfactants on the control of salmonella on poultry carcasses was described by James C. Hill and Frank Ivey in U.S. Pat. No. 4,770,884, dated Sep. 13, 1988. The patent describes the use of various surfactants at a pH of about 4 and a temperature between 0° and 60° C., at a concentration of 50 to 400 ppm.

At the recommended treatment level of up to 400 ppm of the surfactant, and the relatively low pH, tests showed that these measures will interfere with the taste and texture of the bird. At the higher doses of the recommended surfactant poultry meat had a "soapy" taste. The fish meat also acquired the same taste at levels slightly below 100 ppm. The reduced pH of the chiller water, adjusted with phosphoric acid, undesirably changed the texture of the meat. After preparation, the meat was not as tender as the untreated carcasses. These effects can be explained by the absorption effect which takes place when the carcass or meat is immersed in the chiller water. During the chilling process, the carcass will lose most of the blood remaining in the tissue and absorb water in an amount of up to 6% of its weight. Manipulation of the pH level of the water and additives easily alters the taste and texture of the meat so treated. Even the process based on sodium percarbonate and hydrogen peroxide, as described in U.S. Pat. No. 4,683,618, dated Aug. 4, 1987, of Gerard T. O'Brien, interferes with the taste and the texture of the carcass so treated. Based on the mode of application, it is suspected that the sodium carbonate, which increases the pH, changes the poultry meat's taste and texture. Tests to determine the TVA factor, which would indicate the oxidative effect of the 3% hydrogen peroxide, provided inconclusive results, but did indicate problems associated with the exposure of a poultry carcass to 3% hydrogen peroxide for a short period of time.

SUMMARY OF THE INVENTION

An object of the present invention is to provide a process for the treatment of commercially processed animal based food products, including poultry, fowl and seafood to extend the customary shelf life thereof by a commercially significant amount without adversely effecting appearance and taste of the commercially processed food product. In attaining the above and other objects, one feature of the invention resides in treating a commercially processed animal based food product after the product has been eviscerated and the entrails removed by introducing into the chilling step the application of a source of hydrogen peroxide and a suitable surface active agent, both being of food grade materials as determined by FDA regulations at a temperature consistent with the temperature of the chilling water used in the chilling step.

In another feature of the invention, the amount of the source of hydrogen peroxide is such that from 0.05% to 1% of $H_2O_2$ is available for reaction. Optionally, the ranges is from 0.1 to 0.5, most preferably up to 0.25%. Usually the hydrogen peroxide is furnished in commercial concentrations of up to 50%, usually 30-35%.

In carrying out the present invention, the surface active agent is preferably pre-mixed with the peroxide source to form a unique reagent of food grade materials especially formulated for use in commercial processing plants in the chiller system. Generally, it has been found desirable to introduce the pre-mixed treating agent directly into the chilling water via the replacement water to assume good contact with the processed food as it passes through the chiller tank. Alternately, the specially formulated reagent of the invention can be added directly to the chilling tank or sprayed onto the carcasses as they enter the chilling tank apparatus.

Still another feature of the invention is to provide a novel reagent for treatment of commercially processed animal based food products to increase the shelf life thereof.

DETAILED DESCRIPTION OF THE INVENTION

As outlined in a publication from 1987, in volume 67 of the magazine Fleischwirtschaft, by G. Cerny and W. Hennlich, there is no interference with the taste and texture when the carcass is treated with hydrogen peroxide. In the above cited publication, the carcasses were treated with 3% $H_2O_2$ at various temperatures and compared to untreated carcasses Cerny and Hennlich found that the treated carcasses were indistinguishable from the untreated carcasses.

When using a variety of surfactants and quaternary ammonium salts for bacterial control purposes on poultry carcasses, it was found that anionic, nonionic and cationic surfactants and most of the quaternary ammonium salts will provide a good reduction in the overall bacterial plate count. Most of the surfactants and nearly all of the quaternary ammonium salts do interfere, more or less severely, with the taste of the treated carcass. This effect is more severe in commercially processed seafood (e.g. catfish, salmon and shrimp). Reducing the surfactant concentration into the range of 5 to 50 ppm helped somewhat. The surfactants, which showed no interference with the taste of the bird at these low levels, are for example Stepanol TM (trade name from Stepan Corporation), which is a fatty acid, Alkanolamide and Biosoft TM D-40 (trade name from Stepan Corporation), which is a sodium linear alkylate sulfonate. In general, alkyaryl sulfonates, sulfates and sulfonates of oils and fatty acids, sulfates of alcohols and sulfosuccinates and derivatives showed good results in overall bacterial count reduction, without interfering with the taste or the texture of the processed poultry meat. Several of the surfactants which performed well on poultry meat interfered with the taste of any processed fish meat.

As earlier cited, Lillard and Thompson, Journal of Food Science, 1983, described the use of hydrogen peroxide on poultry carcasses and its detrimental effect. Due to the high concentration of hydrogen peroxide used, the skin was severely bleached and partially damaged. Exposed brown chicken meat was also greatly affected. With a reduction of the hydrogen peroxide concentration in the present invention to below 1%, there was minor or no change in the color of the poultry skin. Exposed brown chicken meat was not affected by the low hydrogen peroxide concentration. The tissue of fish and shrimp were slightly bleached at a concentration of below 1% hydrogen peroxide. But in this case, the bleaching does not have an adverse effect on the market value. In fact, the opposite is true because consumers prefer a white catfish fillet and a pinkish white shrimp over the grey brown tinged natural tissue.

Only the combined use of hydrogen peroxide and the surfactant enabled applicants to achieve a substantial reduction in salmonella counts and significant reduction in the total plate count, which led to an extension of the shelf-life of three to five days. There was no obvious difference between the sequential use of surfactant followed by hydrogen peroxide or hydrogen peroxide followed by surfactant, or the combined introduction of hydrogen peroxide and the surfactant simultaneously. One benefit of the present invention is that most of the tested surfactants proved to be stable in hydrogen peroxide, so that the addition of a specialized hydrogen peroxide containing the appropriate surfactant would ease its commercial use and is therefore the preferred mode of application. The specialized hydrogen peroxide product of the invention would contain the appropriate amount of the surfactant to achieve the desired concentration of both components in the chiller water.

This should not limit this invention to this combined use of hydrogen peroxide and the surfactant because, as outlined above, the sequential use will give the same results. Hydrogen peroxide and, preferably, a liquid surfactant can be easily dosed into the chiller water. A sequential use would require a two feed system and enables the user to vary the concentration of the surfactant and of hydrogen peroxide in the chiller water independently. The use of the specialized hydrogen peroxide would require only one feed system, whereby the specialized hydrogen peroxide would contain the level of surfactant needed to achieve the desired mass ratio later on in the chiller water.

In accordance with a detailed aspect of the invention, the novel peroxide reagent consists of from 0.05 to 1% of $H_2O_2$ (food grade) and a member selected from the group consisting of alkyaryl sulfonates, sulfates and sulfonates of fatty acids (10-18 carbons) sulfates of fatty alcohols and sulfosuccinates. These are all well known substances in the art. The preferred composition is sodium lauryl sulfate and $H_2O_2$, both food grade. The substance is used in such an amount and concentration so as to yield up to 1% $H_2O_2$, preferably up to 0.9% $H_2O_2$ in the chiller water and 5 to 100, preferably 5-50 ppm surface active agent in the chiller water.

The following examples serve to illustrate the present invention.

EXAMPLES

For the laboratory evaluation, commercially available chicken drumsticks, chicken wings, catfish fillets and whole shrimp were used. Most of the test pieces were inoculated with salmonella typhimurium by dipping them into an aqueous suspension containing $10^7$ organisms per milliliter. After draining them for an hour, the pieces were immersed in a down-scaled chiller and kept for forty-five minutes at 36° to 42° F.

EXAMPLE 1

Numerous experiments were conducted with poultry parts, catfish parts and shrimp. In this test, applicants compared the effects of various concentrations of hydrogen peroxide on the total plate count (TPC), the salmonella count (SALM), the total plate count in the chiller water (water TPC), and the total salmonella count in the chiller water (water SALM). Reported are the plate counts in $log_{10}$ per milliliter of parts rinse. The water plate counts are reported in $log_{10}$ per milliliter of chiller water. Reported are the numbers for the non-inoculated control (NIC), the inoculated control (IC), and the results for 0.1%, 0.25%, 0.5% and 1% hydrogen peroxide. Except for the non-inoculated control, all the results, disregarding the origin of the probe (poultry, fish and shrimp), showed very similar numbers so that the report contains the average results.

TABLE 1

| Treatment | TPC | SALM | Water TPC | Water SALM |
|---|---|---|---|---|
| NIC | 4.62 | 0 | NA | NA |
| IC | 7.75 | 7.36 | 6.78 | 4.9 |
| 0.1% | 7.45 | 5.85 | 3.26 | <3.00 |
| 0.25% | 7.62 | 5.52 | <3.00 | <3.00 |
| 0.5% | 7.14 | 5.42 | <3.00 | <3.00 |
| 1.0% | 6.15 | 3.99 | <3.00 | <3.00 |

EXAMPLE 2

A series of experiments were conducted to evaluate the results of individual surfactants on the poultry and fish probe. Again, total plate count, salmonella count, water total plate count and water salmonella count are reported. Table 2 shows the results obtained with Stepanol, Table 3 shows the results for Ninol and Table 4 shows the results for Biosoft D-40. Due to the similarity of the results for the individual probes, applicants are reporting average numbers.

TABLE 2

| Treatment | TPC | SALM | Water TPC | Water SALM |
|---|---|---|---|---|
| NIC | 5.94 | 0 | NA | NA |
| IC | 7.75 | 6.81 | 7.28 | 5.49 |
| 10 mg SLS | 8.61 | 6.38 | >7.00 | 4.95 |
| 30 mg SLS | 7.70 | 5.71 | 6.76 | 4.99 |
| 50 mg SLS | 7.37 | 6.12 | 6.72 | 4.75 |

TABLE 2-continued

| Treatment | TPC | SALM | Water TPC | Water SALM |
|---|---|---|---|---|
| 100 mg SLS | 7.07 | 6.46 | 5.52 | 4.95 |

TABLE 3

| Treatment | TPC | SALM | Water TPC | Water SALM |
|---|---|---|---|---|
| NIC | 3.92 | 0 | NA | NA |
| IC | 7.60 | 6.49 | 7.40 | 4.74 |
| 50 mg Ninol | 7.82 | 6.56 | 6.56 | 6.26 |
| 100 mg Ninol | 7.79 | 6.96 | 6.39 | 5.36 |
| 300 mg Ninol | 7.78 | 6.71 | 6.95 | 5.86 |

TABLE 4

| Treatment | TPC | SALM | Water TPC | Water SALM |
|---|---|---|---|---|
| NIC | 3.82 | 0 | NA | NA |
| IC | 7.38 | 6.31 | 7.00 | 5.19 |
| 50 mg D-40 | 7.89 | 6.52 | 6.45 | 5.41 |
| 100 mg D-40 | 7.47 | 6.42 | 7.05 | 5.45 |
| 300 mg D-40 | 7.83 | 6.68 | 6.73 | 5.30 |

EXAMPLE 3

Tests were conducted to evaluate the combination of 0.25% hydrogen peroxide and 50 milligrams per liter of either Ninol, D-40 or Stepanol. The conditions were identical to those in experiment 1. Reported are the total late count, the salmonella count, the water total plate count and the water salmonella count.

TABLE 5

| Treatment | TPC | SALM | Water TPC | Water SALM |
|---|---|---|---|---|
| NIC | 5.72 | 0 | NA | NA |
| IC | 7.06 | 6.47 | 6.27 | 5.52 |
| 0.25%/Ninol | 7.14 | 4.17 | 5.92 | 0.70 |
| 0.25%/D-40 | 7.42 | 4.98 | 5.76 | <1.00 |
| 0.25%/SLS | 6.38 | 3.74 | 0 | 0 |

EXAMPLE 5

Several tests were conducted to evaluate the effects of different levels of hydrogen peroxide combined with Stepanol. The test conditions were identical to those in Example 1 and we again report total plate count, salmonella count, water total plate count and water salmonella count.

TABLE 6

| Treatment | TPC | SALM | Water TPC | Water SALM |
|---|---|---|---|---|
| NIC | 5.68 | 0 | NA | NA |
| IC | 7.55 | 7.36 | 6.76 | 5.57 |
| 0.1%/10 mg SLS | 7.51 | 6.57 | 3.36 | <2.00 |
| 0.1%/30 mg SLS | 7.18 | 5.39 | 3.18 | <2.00 |
| 0.25%/10 mg SLS | 7.47 | 5.28 | 0 | 0 |
| 0.25%/30 mg SLS | 6.46 | 3.83 | 0 | 0 |

EXAMPLE 5

A variety of test were performed to evaluate the effect of hydrogen peroxide and the evaluated surfactants on the color of the poultry skin and on the surface of the fish and the shrimp tissue. In Table 7, we report the color reflectance values of drumsticks treated with hydrogen peroxide and Stepanol. It is very important not to alter the appearance of the poultry skin.

TABLE 7

| Treatment | Position 1 | | | Position 2 | | |
| --- | --- | --- | --- | --- | --- | --- |
| NIC | 70.58 | −0.80 | 7.40 | 71.62 | 2.04 | 7.58 |
| IC | 71.86 | 0.50 | 7.92 | 71.84 | 1.22 | 6.40 |
| 0.1%/10 mg SLS | 71.90 | 0.48 | 5.00 | 71.98 | 0.74 | 5.24 |
| 0.1%/30 mg SLS | 71.38 | −0.12 | 9.04 | 72.18 | 1.06 | 7.60 |
| 0.25%/10 mg SLS | 70.64 | −1.00 | 4.08 | 72.24 | 1.52 | 6.40 |
| 0.25%/30 mg SLS | 72.76 | 1.02 | 4.82 | 75.10 | 3.18 | 5.24 |

L value (0 to 100; 0 = black, 100 = white)
a value (−60 to +60; −60 = green, +60 = red)
b value (−60 to +60; −60 = blue, +60 = yellow)

Further variations and modifications of the present invention will be apparent to those skilled in the art from the foregoing and are intended to be encompassed by the claims appended hereto.

We claim:

1. A process for reducing the overall bacterial count without interfering with the taste or texture of commercially processed animal based food product and thereby increase the shelf life thereof comprising contacting said food product with a sufficient amount of food grade $H_2O_2$ and food grade surface active agent selected from the group consisting of alkylaryl sulfonates, sulfates, sulfonates of oils and fatty acids, sulfates of alcohols and sulfosuccinates present together in the chiller water to remove and reduce the number of bacteria on the surface of said food product.

2. The process according to claim 1, wherein said $H_2O_2$ is present in the chiller water in the amount of 0.05% to 1% by weight.

3. The process according to claim 1, wherein the surface active agent is sodium lauryl sulfate.

4. The process according to claim 1, wherein the amount of surface active agent is 5 ppm to 100 ppm of the chiller water.

5. The process according to claim 1, wherein the $H_2O_2$ and the surface active agent are charged simultaneously into the chiller water.

6. A specially formulated reagent for reducing the number of bacteria in a commercially processed animal based food product consisting of food grade $H_2O_2$ and food grade sodium lauryl sulfate.

* * * * *